United States Patent [19]

Houston et al.

[11] 4,365,410
[45] Dec. 28, 1982

[54] CONDUCTOR TRANSFER DEVICE

[75] Inventors: Herbert J. Houston; Edward S. Dinsmore, both of Oakville, Canada

[73] Assignee: Slater Steel Industries Limited, Hamilton, Canada

[21] Appl. No.: 239,527

[22] Filed: Mar. 2, 1981

[51] Int. Cl.³ .......................................... H01R 43/00
[52] U.S. Cl. .................................. 29/762; 29/426.5; 254/93 R; 254/134.3 PA
[58] Field of Search ............... 29/762, 745, 631, 825, 29/426.5; 254/93 R, 93 H, 93 P, 134.3 PA, 134.3 R

[56] References Cited

U.S. PATENT DOCUMENTS 4,189,828  2/1980  Chadwick, Jr. ..................... 29/762

*Primary Examiner*—Carl E. Hall
*Attorney, Agent, or Firm*—Burgess, Ryan and Wayne

[57] ABSTRACT

A device enabling movement of an electrical conductor through a string of insulators coupled between a supporting tower and a yoke plate. An upper frame having clamping jaws for engaging one of the insulators is pivotally mounted to a lower frame connectable to the yoke plate. A hydraulic cylinder causes the frames to rotate relative to each other, to relieve stress on the lower portion of the insulator string, so that it can be uncoupled to permit movement of the conductor through it.

5 Claims, 3 Drawing Figures

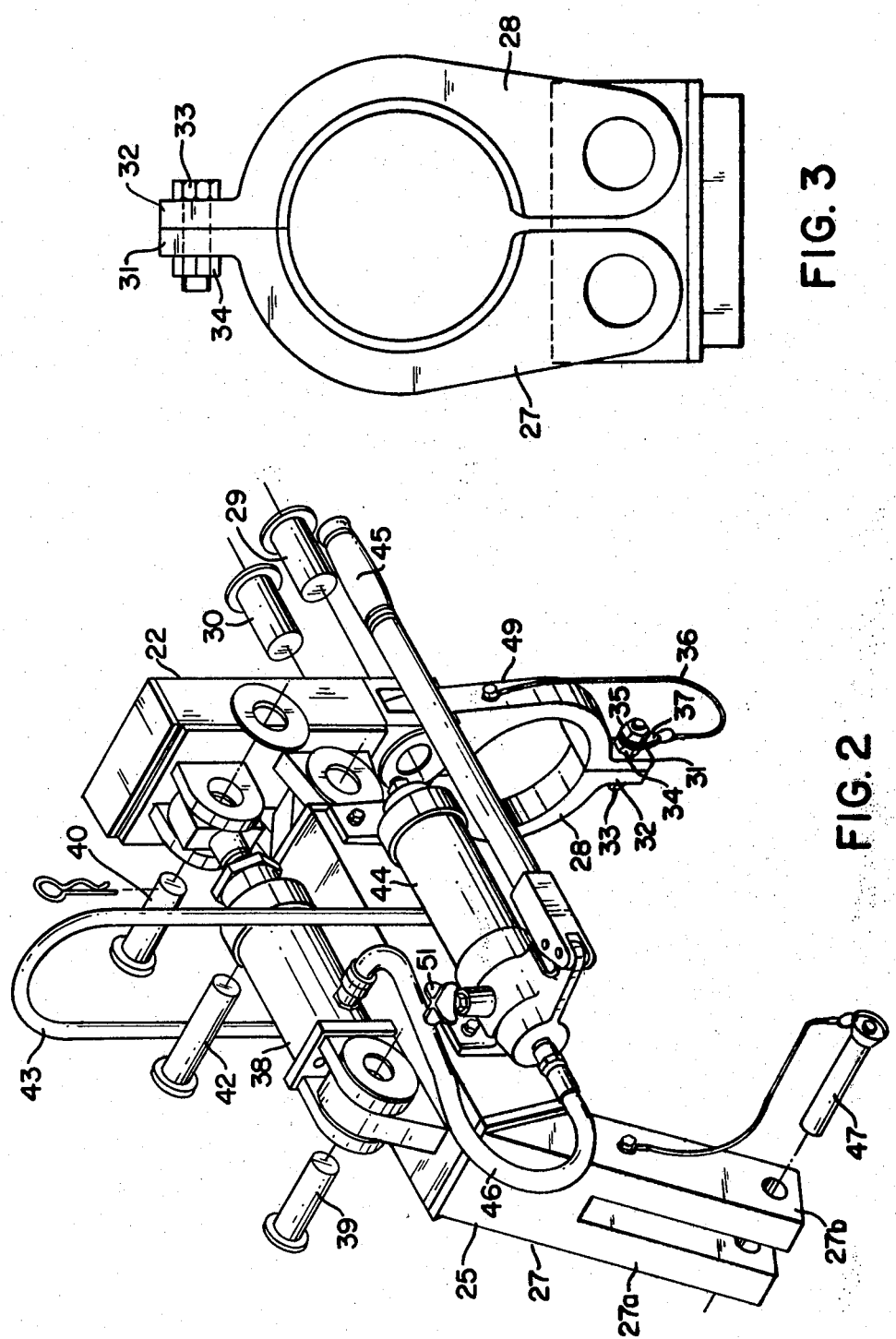

CONDUCTOR TRANSFER DEVICE

BACKGROUND OF THE INVENTION

This invention relates to the aerial stringing of electrical conductors, and more particularly to a tool for facilitating the movement of a conductor from one side to the other of an insulator string extending from a support tower to a yoke plate or the like.

U.S. Pat. No. 4,053,706 describes a suspension bracket assembly for supporting high voltage conductors in an inverted V configuration, so that the upper conductor is situated between the lower ends of the insulators which support the suspension bracket, thus minimizing electrical stress on the insulator lower ends.

However, in order to install the upper conductor on said suspension bracket assembly, it is necessary to move it through one of the insulator strings. A method for doing this is described in U.S. Pat. No. 4,022,431.

U.S. Pat. No. 4,189,828 describes an installation tool, or conductor transfer device, for temporarily mechanically bypassing the lower end of one of the supporting insulator strings, so that said end can be temporarily opened to permit moving of the upper conductor through it to the installation position on the suspension bracket assembly.

The tool described in U.S. Pat. No. 4,189,828 has an upper frame with a clamp arm assembly at the upper end thereof for engaging the conductor string at a point remote from the bracket assembly or yoke plate; and a lower arm having a lower end engageable with said assembly or plate. The frames are slidably movable toward and away from each other on a pair of guide pins, and such linear movement is provided by a hydraulic cylinder. Disadvantages of this tool are (i) a clamp assembly structure which is cumbersome to operate and (ii) the risk of binding of the sliding frame with respect to the guide pins.

Accordingly, an object of the present invention is to provide an improved conductor transfer device of the general type disclosed in U.S. Pat. No. 4,189,828, the disclosure of which is incorporated herein by reference.

IN THE DRAWING:

FIG. 2 is a partially exploded isometric view of said device; and

FIG. 3 is an elevation view of the clamp arm assembly of said device.

SUMMARY

Figure 1:
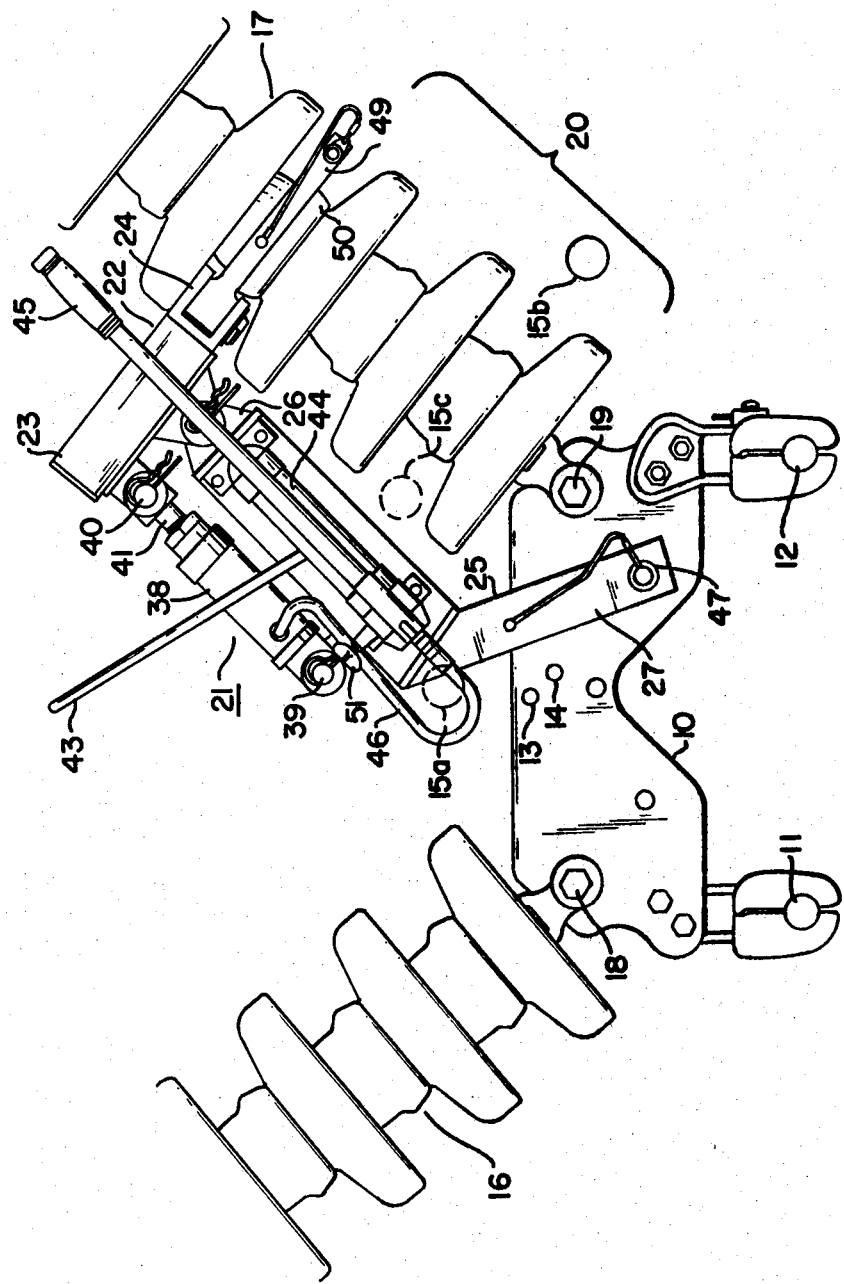
FIG. 1 is an elevation view showing a conductor transfer device according to a preferred embodiment of the invention, in the conductor installation position.

As herein described, there is provided a device enabling movement of a conductor from one side to the other of a string of insulators coupled between a tower and a yoke plate, comprising an upper frame having clamping means at its upper end for engaging an intermediate portion of said string; a lower frame having securing means at its lower end for engaging said yoke plate; means interconnecting the lower end of said upper frame and the upper end of said lower frame for effecting approximately longitudinal movement of the upper end of the upper frame and the lower end of the lower frame relative to each other to permit uncoupling of a selected portion of said string to permit movement of said conductor past said selected portion from one side of said string to the other and subsequent recoupling of said selected portion of said string, wherein said clamping means and said securing means are aligned with each other longitudinally of the device to define a longitudinal axis, the lower end of said upper frame, the upper end of said lower frame and said means for interconnecting the same being offset relative to said axis, said means for effecting longitudinal movement of said frames relative to each other comprising means for pivotally mounting the upper end of the lower frame to a part of the upper frame intermediate the ends thereof, and extensible means coupled between the lower frame and the lower end of the upper frame for causing relative rotation of said frames, so that said lower end of said upper frame moves away from said lower frame, and said upper end of said upper frame moves toward said lower frame.

DETAILED DESCRIPTION

As shown in FIG. 1, a yoke plate 10 supports electrical conductors 11 and 12, and has mounting holes 13 and 14 for securing a vertical support bracket (not shown) to support a third or upper electrical conductor, shown in the installation position as 15a and in its position prior to installation as 15b.

The yoke plate 10 is supported by a left insulator string 16 and a right insulator string 17, with the lower end of the left string being secured to the yoke plate by means of a bolt 18, and the lower end of the right string 17 being secured to said plate by means of a bolt 19.

Each of the insulator strings 16 and 17 is supported by a tower (not shown), with the weight of the cables 11 and 12 placing the strings under tension.

In order to move the upper conductor from the initial position 15b to the installation position 15a, it is necessary to relieve the tension placed on the bolt 19 by the lower end 20 of the insulator string 17. Then the bolt 19 can be removed, the lower end of the insulator string displaced to allow the conductor 15b to move through it, and (after realigning the bolt 19 with the clevis hole in the yoke plate 10) the bolt 19 can be reinstalled.

This sequence of operation is facilitated by means of the conductor transfer device 21, which has an upper frame 22 with a lower end 23 and an upper end 24; and a lower frame 25 with an upper end 26 and a lower end 27. The upper end 26 of the lower frame 25 is pivotally secured to a portion of the upper frame 22 intermediate between the ends 23 and 24 thereof.

The lower end 27 of the lower frame 25 has a bifurcated (or forked) end part comprising legs 27a and 27b which straddle the yoke plate 10.

Pivotally mounted at the upper end 24 of the upper arm 22 are a pair of semi-circular jaws 49 and 28 rotationally supported by the pins 29 and 30 respectively. The lower ends of the jaws 49 and 28 have flat extensions 31 and 32 respectively, with aligned holes therein through which a bolt 33 extends and is secured by a nut 34.

An additional nut 35 may be provided to secure the bolt 33 and nut 34 to the jaw 49 by means of a flexible wire 36 and lug 37.

A hydraulic cylinder 38 having a hydraulic piston therein extends between, and is pivotally coupled at its lower end to the lower frame 25 via pin 39, and at its upper end to the lower end 23 of the upper frame 22 via pin 40, so that extension of the piston arm 41 of the cylinder 38 causes the frames 22 and 25 to rotate relative to each other about the pivot pin 42, with the lower ends 23 of the upper frame 22 moving away from the lower frame 25, and the upper end 24 of the upper frame 22 moving toward the lower frame 25. When this occurs, the jaws 49 and 28, which are secured to the upper portion of the lower end 20 of the insulator string 17 (FIG. 1), move toward the bolt 19, relieving tension on said bolt, and permitting the bolt to be removed.

Handling of the tool 21 is facilitated by a lifting arm 43 which is secured to the lower frame 25.

A manually operable hydraulic pump 44 is operated by a handle 45, and is hydraulically coupled to cylinder 38 by a flexible hose 46.

A detent pin 47 extends through aligned holes in the lower end 27 of the lower frame 25 and the yoke plate 10, to maintain the same in mutual engagement.

In order to utilize the conductor transfer device 21, the retaining nuts 34 and 35 and lug 37 are removed from the clamp arm assembly comprising jaws 49 and 28, and the jaws are opened by rotation about the pins 29 and 30.

The transfer device 10 is positioned so that the clamp arms 49 and 28 may be closed around the desired insulator segment 50, and the arms are then brought together around said segment so that the bolt 33 can be inserted through the holes of the extensions 31 and 32, and secured hand tight with the nut 34.

The transfer device 10 is then lowered into position utilizing suitable tackle (not shown) attached to lifting ring 43, and positioned as shown in FIG. 1. The transfer device is adjusted until the holes in the legs 27a and 27b are aligned with the corresponding hole in the yoke plate 10, and the detent pin 47 is then inserted through said holes.

In order to align the holes of the legs 27a and 27b with the clevis hole of the yoke plate 10, it may be necessary to adjust the hydraulic cylinder 38. This can be done by turning valve handle 51 fully clockwise to close the valve of the manually operable hydraulic pump 44. The pump handle 45 can then be moved up and down to deliver oil to the hydraulic cylinder 38 to reduce the distance between the holes in the legs 27a and 27b and the clamp arms 49 and 28, to properly align said holes with the clevis hole in the yoke plate 10. Then the detent pin 47 may be inserted through said holes.

In the next step the valve 51 is turned fully clockwise, if it is not already in that position. Handle 45 is pumped until the upper end 24 of the upper frame 22 moves toward the lower frame 25 a sufficient distance to release the tension load on the bolt 19 which secures the lower end of the insulator string 17. The bolt 19 is then temporarily removed and, while holding onto the lower end 20 of the insulator string 17, valve 51 is cracked (i.e., slightly opened) counterclockwise to allow the clamp arms 49 and 28 to move the lower end 20 of the insulator string 17 away from the yoke plate 10, thus providing an opening between the yoke plate and insulator string for passage of the conductor 15b.

The conductor 15b is then moved to a position between the portion of the lower frame 25 inboard of the insulator string 17 and said insulator string, e.g., position 15c.

Valve 51 is now closed by rotating it fully clockwise and, while holding the lower end 20 of insulator string 17 in a position as close as possible to that shown in FIG. 1, handle 45 is pumped to again align the lower end of the insulator string 17 with the clevis socket hole in the yoke plate 10, so that bolt 19 can be re-installed.

The clamp arm assembly is then removed by removing nut 33 from bolt 34, and rotating the clamp arms 49 and 28 to clear the insulator 50. The detent pin 47 is then removed, and the tackle is raised to lift the arm 43 and tool 21.

Then the conductor 15c can be moved to the installation position 15a thereof.

What is claimed is:

1. A device enabling movement of a conductor from one side to the other of a string of insulators coupled between a tower and a yoke plate, comprising:
    an upper frame having clamping means at its upper end for engaging an intermediate portion of said string;
    a lower frame having securing means at its lower end for engaging said yoke plate;
    means interconnecting the lower end of said upper frame and the upper end of said lower frame for effecting approximately longitudinal movement of the upper end of the upper frame and the lower end of the lower frame relative to each other to permit uncoupling of a selected portion of said string to permit movement of said conductor past said selected portion from one side of said string to the other and subsequent recoupling of said selected portion of said string,
    wherein said clamping means and said securing means are aligned with each other longitudinally of the device to define a longitudinal axis,
    the lower end of said upper frame, the upper end of said lower frame and said means for interconnecting the same being offset relative to said axis,
    said clamping means comprising:
        a first semi-circular jaw having a lateral extension with a first hole therein, said first jaw being pivotally mounted at its opposite end to the upper end of said upper frame,
        a second semi-circular jaw shaped complementally to said first jaw with a lateral extension having a second hole therein aligned with said first hole and pivotally mounted at its opposite end on said upper end of said upper frame, a bolt adapted for movement into and out of said aligned holes, and a nut threaded on said bolt for engagement with said lateral extension of said second jaw,
    said means for effecting longitudinal movement of said frames relative to each other comprising means for pivotally mounting the upper end of the lower frame to a part of the upper frame intermediate the ends thereof, and extensible means coupled between the lower frame and the lower end of the upper frame for causing relative rotation of said frames, so that said lower end of said upper frame moves away from said lower frame, and said upper end of said upper frame moves toward said lower frame.

2. A device enabling movement of a conductor from one side to the other of a string of insulators coupled between a tower and a yoke plate, comprising:
    an upper frame having clamping means at its upper end for engaging an intermediate portion of said string;
    a lower frame having securing means at its lower end for engaging said yoke plate;
    means interconnecting the lower end of said upper frame and the upper end of said lower frame for effecting approximately longitudinal movement of the upper end of the upper frame and the lower end of the lower frame relative to each other to permit uncoupling of a selected portion of said string to permit movement of said conductor past said selected portion from one side of said string to the other and subsequent recoupling of said selected portion of said string, wherein said clamping means and said securing means are aligned with each other longitudinally of the device to define a longitudinal axis, the lower end of said upper frame, the upper end of said lower frame and said means for interconnecting the same being offset relative to said axis, said means for effecting longitudinal movement of said frames relative to each other comprising means for pivotally mounting the upper end of the lower frame to a part of the upper frame intermediate the ends thereof, and extensible means coupled between the lower frame and the lower end of the upper frame for causing relative rotation of said frames, so that said lower end of said upper frame moves away from said lower frame, and said upper end of said upper frame moves toward said lower frame.

3. The device according to claim 1 or 2, wherein said extensible means is also retractable.

4. The device according to claim 3, wherein said extensible means comprises a hydraulic piston.

5. The device according to claim 4, further comprising a manually operable hydraulic pump mounted on said lower frame and hydraulically coupled to said piston.

* * * * *